(12) United States Patent
Teran Guajardo et al.

(10) Patent No.: US 11,042,505 B2
(45) Date of Patent: Jun. 22, 2021

(54) IDENTIFICATION, EXTRACTION AND TRANSFORMATION OF CONTEXTUALLY RELEVANT CONTENT

(71) Applicant: Microsoft Technology Licensing, LLC, Redmond, WA (US)

(72) Inventors: Adrian Francisco Teran Guajardo, Redmond, WA (US); Hung Minh Dang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 15/953,924

(22) Filed: Apr. 16, 2018

(65) Prior Publication Data

US 2019/0318011 A1 Oct. 17, 2019

(51) Int. Cl.
  *G06F 16/11* (2019.01)
  *G06N 7/00* (2006.01)
  *G06N 20/00* (2019.01)

(52) U.S. Cl.
  CPC .......... *G06F 16/116* (2019.01); *G06N 7/005* (2013.01); *G06N 20/00* (2019.01)

(58) Field of Classification Search
  USPC ........................................................ 707/756
  See application file for complete search history.

(56) References Cited

U.S. PATENT DOCUMENTS

| | | | | |
|---|---|---|---|---|
| 8,630,961 B2 * | 1/2014 | Beilby | ................... | G06N 3/004 706/11 |
| 9,563,705 B2 * | 2/2017 | Taank | ................... | G06F 16/951 |
| 10,326,748 B1 * | 6/2019 | Brisebois | ................. | G06F 21/31 |
| 2003/0018659 A1 * | 1/2003 | Fuks | ...................... | G06Q 30/02 715/230 |
| 2007/0112764 A1 | 5/2007 | Yih et al. | | |
| 2010/0082608 A1 * | 4/2010 | Mediano | ............... | G06F 16/951 707/723 |

(Continued)

FOREIGN PATENT DOCUMENTS

EP 1708105 A1 10/2006

OTHER PUBLICATIONS

"International Search Report and Written Opinion Issued in PCT Application No. PCT/US19/025085", dated Jun. 21, 2019, 13 Pages.

(Continued)

*Primary Examiner* — Cam Linh T Nguyen
(74) *Attorney, Agent, or Firm* — Rainier Patents, P.S.

(57) ABSTRACT

Described herein is a system and method for transforming contextually relevant items. A search query is received, and, for each of a plurality of electronically stored items (e.g., stored in a source platform), a probability that the stored item is relevant to the search query is calculated using a classification model. Stored items having a calculated probability greater than or equal to a threshold probability are identified. Contextually relevant portions of the identified stored items is determined using a contextual model. The determined contextually relevant portions of the identified stored items are extracted. The extracted contextually relevant portions of the identified stored items are transformed into a target platform. An output of the extracted contextually relevant portions of the identified stored items in the target platform is provided.

20 Claims, 6 Drawing Sheets

(56) References Cited

U.S. PATENT DOCUMENTS

| | | | |
|---|---|---|---|
| 2010/0145976 A1* | 6/2010 | Higgins | G06F 16/3322 |
| | | | 707/765 |
| 2012/0011142 A1* | 1/2012 | Baheti | G06K 9/4671 |
| | | | 707/769 |
| 2012/0173243 A1* | 7/2012 | Anand | G06F 40/40 |
| | | | 704/270.1 |
| 2012/0290950 A1* | 11/2012 | Rapaport | H04L 51/32 |
| | | | 715/753 |
| 2014/0310001 A1* | 10/2014 | Kalns | G10L 15/32 |
| | | | 704/270.1 |
| 2015/0032645 A1 | 1/2015 | Mckeown et al. | |
| 2016/0034514 A1* | 2/2016 | Singhal | G06F 16/9535 |
| | | | 707/706 |
| 2017/0091612 A1* | 3/2017 | Gruber | G06F 40/169 |
| 2017/0206052 A1* | 7/2017 | Sarkar | G06F 3/1454 |
| 2017/0270427 A1 | 9/2017 | Zhou et al. | |
| 2017/0337265 A1* | 11/2017 | Garrett | G06F 40/103 |
| 2018/0082183 A1* | 3/2018 | Hertz | G06Q 10/10 |

OTHER PUBLICATIONS

Ponzanelli, et al.,"Too Long; Didn't Watch! Extracting Relevant Fragments from Software Development Video Tutorials", In the Proceedings of 38th IEEE International Conference on Software Engineering, May 14, 2016, pp. 261-272.

* cited by examiner

IDENTIFICATION, EXTRACTION AND TRANSFORMATION OF CONTEXTUALLY RELEVANT CONTENT

BACKGROUND

Computer users can utilize application(s) (e.g., instant communication system(s), team management solution(s), word processing, spreadsheet, database, slide presentation, electronic mail, drawing, note taking, web browser, etc.) to store and/or consume information. Further, users frequently communicate via one or more communication modalities (e.g., email, instant messaging, letters, etc.)

Thus, ever increasing, vast amounts of information are stored electronically in various formats. Making meaningful sense of these vast amounts of information can be a daunting task for even a skilled computer user.

SUMMARY

Described herein is a system for transforming contextually relevant items, comprising: a processing system comprising a processor and memory having computer-executable instructions stored thereupon which, when executed by the processor, cause the processing system to: receive a search query; calculate a probability, for each of a plurality of electronically stored items, that the stored item is relevant to the search query using a classification model, the plurality of electronically stored items stored in a source platform; identify stored items having a calculated probability greater than or equal to a threshold probability; determine contextually relevant portions of the identified stored items using a contextual model; extract the determined contextually relevant portions of the identified stored items; transform the extracted contextually relevant portions of the identified stored items into a target platform; and, provide an output of the extracted contextually relevant portions of the identified stored items in the target platform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to identifying, extracting and transforming contextually relevant portions of electronically stored items are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding identifying, extracting and transforming contextual relevant portions of electronically stored items. What follows are one or more exemplary systems and methods.

Aspects of the subject disclosure pertain to the technical problem of transforming electronically stored information from a source platform to a target platform. The technical features associated with addressing this problem involve receiving a search term; calculate a probability, for each of a plurality of electronically stored items, that the stored item is relevant to the search term using a probabilistic algorithm, the plurality of electronic stored items stored in a source platform; identifying stored items having a calculated probability greater than or equal to a threshold probability; determining contextually relevant portions of the identified stored items using a model trained with a machine learning algorithm; extracting the determined contextually relevant portions of the identified stored items; and, transforming the extracted contextually relevant portions of the identified stored items into a target platform. Accordingly, aspects of these technical features exhibit technical effects of more efficiently and effectively utilizing computer resource(s) (e.g., processing time, memory and/or storage space).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Figure 1:
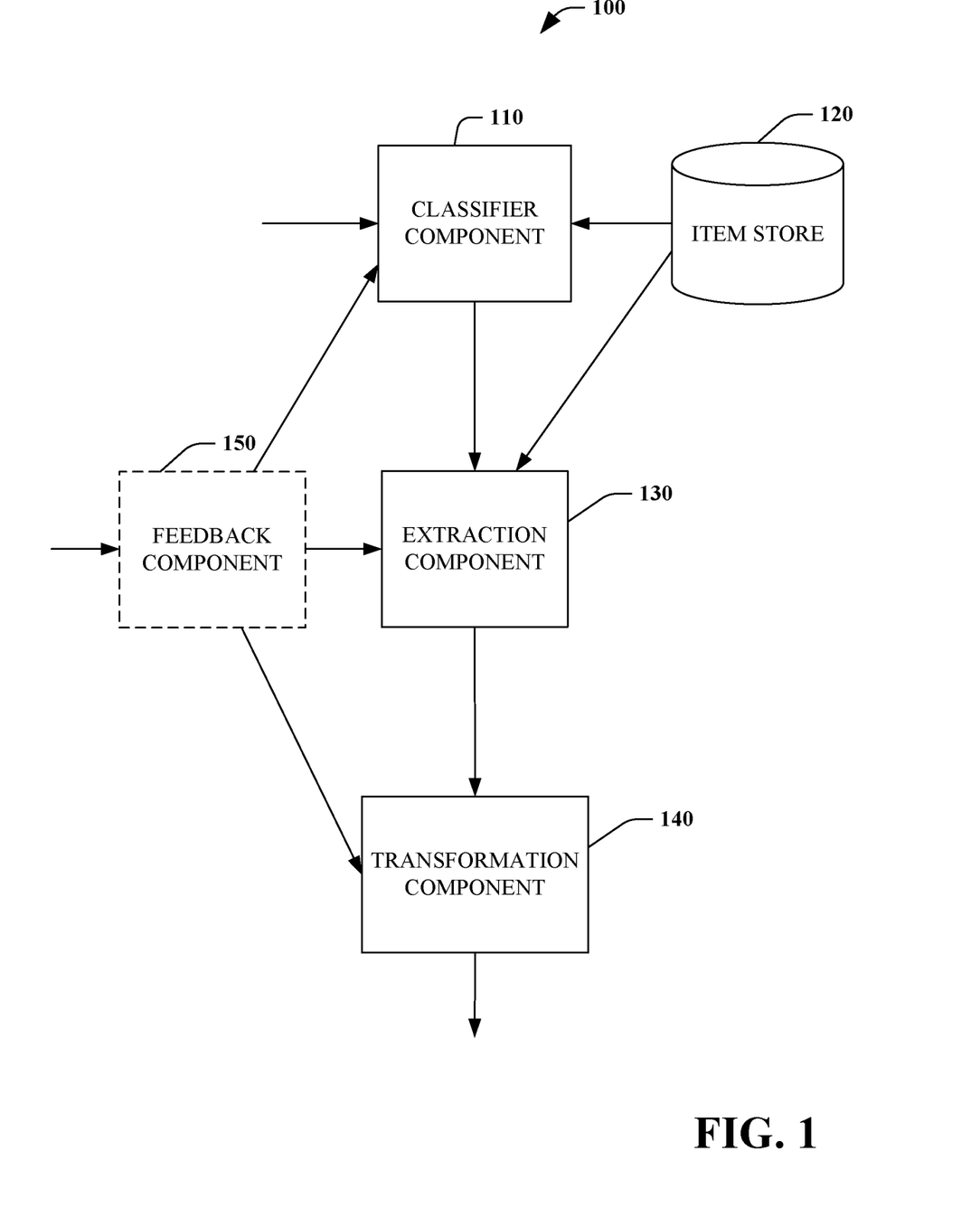
FIG. 1 is a functional block diagram that illustrates a system for transforming contextually relevant items.

Referring to FIG. 1, a system for transforming contextually relevant items 100 is illustrated. The system 100 can mine items stored in a source platform in a contextually meaningful manner based upon a search query. The system 100 can further extract portions of identified items and transform the extracted portions into a target platform.

Generally, computer systems and services store electronic data items in a particular format and/or schema based, for example, upon an associated application (e.g., instant messaging, team management solutions such as Microsoft Teams, audio and/or video communicating, word processing, email, spreadsheet, etc.). As used herein, "source platform" and "target platform" refer to a format and/or schema of electronically stored source data.

For example, emails associated with a particular user can have a date and time field, a sender field, a copy field, a recipient field, a subject field and/or a body field. Information stored in each of these fields has a particular contextual meaning to a user and the application. However, one, some or all of these fields may not be contextually meaningful (or less meaningful) to another application or target platform.

In some embodiments, the electronically stored items can comprise existing support data (e.g., emails, Skype® conversations, documents, etc.) where data subsets share context (e.g., instance threads of answers to a specific or loosely related subjects or area in one or multiple developers email inbox). Overtime, as the support data grows it is desirable to identify the existing support data and move it to a more robust system (e.g., MSDN, wiki, etc.). Using agents and machine learning trained model(s), in some embodiments, the system 100 can contextually identify data related to a set of subjects or areas, extract the contextually identified data and transform it to a target platform. For example, a machine learning model can be trained on a group's specification store and/or code repository to build knowledge/context related to the group's features, then this model can be leveraged by the system 100 to scan the group's email and stored telecommunication conversations for related threads, extracting meaningful context and transforming these to a target platform (e.g., question and answer threads).

The system 100 includes a classifier component 110 that receives a search query. In some embodiments, the search query can include word(s) and/or phrase(s) to control, at least in part, the transformation of relevant portion(s) of electronically stored items from a source platform to one or more target platforms. In some embodiments, a user can be prompted for word(s) and/or phrase(s) using a graphical user interface that identifies a list of subjects based on content of an item store 120 (e.g., suggested list of subjects).

In some embodiments, the classifier component 110 can have access to substantially all items stored in the item store 120. For example, the classifier component 110 can have access to all of a particular team's email boxes. In some embodiments, the classifier component 110 has access to only a subset of items stored in the item store 120, for example, based upon access credential(s) of a particular user and/or group of users.

For each of a plurality of electronically stored items stored in the item store 120 (e.g., source platform), the classifier component 110 calculates a probability that the stored item is relevant to the search query using a classification model. In some embodiments, the stored items can include binary files, database files, text-based files, image(s), video(s) and/or audio files. In some embodiments, the classifier component 110 parses the items stored in the item store 120 bundling sets of information that are related. For example, threads that contain sequences of questions and responses related to the initial set of words and phrases.

The classification model can be trained using a machine learning process that takes advantage of various features present in historical data with the classification model representing an association among the features. In some embodiments, one of the features when training the classification model is a source platform, a format associated with the source platform, and/or a schema associated with the source platform. In some embodiments, presence of the search query (or portion thereof) in a particular field of a schema (e.g., subject field) is given greater weight than presence of the search query (or portion thereof) in another particular field of the schema (e.g., body of email field). In some embodiments, one of the features when training the classification model is one or more target platforms, a format associated with one or more target platforms, and/or schema associated with one or more target platforms.

In some embodiments, one of the features when training the classification model is an organizational hierarchy and/or group membership. In some embodiments, item(s) originating from an individual ranking higher in the organizational hierarchy is deemed more significant than item(s) originating from an individual ranking lower in the organizational hierarchy (or vice versa). In some embodiments, item(s) originating from an individual having membership in a particular group is deemed more significant than item(s) originating from an individual not having membership in the particular group (or vice versa).

In some embodiments, the classification model is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, and/or a Gradient Boost & Adaboost algorithm.

The classifier component 110 can further identify stored items having a calculated probability greater than or equal to a threshold probability. For example, the classifier component 110 can filter out particular items with a calculated probability lower than the threshold probability from inclusion in the output, as discussed below. In some embodiments, the threshold probability is predetermined. In some embodiments, the threshold probability is defined by a user, for example, as a user-configurable setting and/or received with the search query.

Thus, in some embodiments, the classifier component 110 can identify meaningful blocks of related information on an original environment (e.g., source platform). For example, for a search query comprising a specific set of keywords, the classifier component 110 can identify emails that contain the specific set of keywords in the title, content, and/or that belong to a specific conversation thread, and/or originate from a specific source.

In some embodiments, the classifier component 110 comprises a single classification model trained on one or more source platforms and/or one or more target platforms. For example, a particular classification model can be trained in order to transform items stored in a particular source platform (e.g., word processing documents) without regard to the target platform(s).

In some embodiments, the classifier component 110 comprises a plurality of classification models with each trained for a particular source platform and/or one or more target platforms. For example, a particular classification model can be trained in order to transform items stored in a particular source platform (e.g., emails) into a plurality of target platforms.

In some embodiments, a particular classification model can be trained in order to transform items stored in a particular source platform taking into account a particular target platform. For example, a particular classification model can be trained in order to transform items stored in a particular source platform (e.g., emails) into a particular target platform (e.g. document used for internal training purposes).

The system 100 further includes an extraction component 130 that determines contextually relevant portions of the identified stored items using a contextual model. The contextual model can employ a plurality of features when determining contextually relevant portions of the identified stored items. In some embodiments, the features include a schema associated with the source platform, a schema associated with the target platform, and/or the search query.

The extraction component 130 further extracts the determined contextually relevant portions of the identified stored items. In some embodiments, the extraction component 130 extracts the determined contextually relevant portions in a privacy preserving manner, for example, by removing any personally identifiable information. In some embodiments, the extraction component 130 extracts the determined contextually relevant portions in a confidentiality preserving manner, for example, removing, hiding and/or otherwise obscuring confidential information such as trade secrets, internal project names and the like.

In some embodiments, the contextually relevant portion can include a sentence, a sentence fragment, a paragraph, a paragraph fragment, a section of a document, a field of a document, an image, a video or portion thereof, an audio file, and/or portion thereof.

In some embodiments, an amount (e.g., size of portion) extracted from a particular identified stored item is based, at least in part, upon the probability calculated by the classifier component 110. For example, greater portions can be extracted from identified stored items having higher probabilities and smaller portions can be extracted from identified stored items having lower probabilities.

The contextual model can be trained using a machine learning process that takes advantage of various features present in historical data with the contextual model representing an association among the features. In some embodiments, one of the features when training the contextual model is a source platform, a format associated with the source platform, and/or schema associated with the source platform. In some embodiments, one of the features when training the contextual model is one or more target platforms, a format associated with one or more platforms, and/or schema associated with one or more target platforms.

In some embodiments, the contextual model is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, and/or a Gradient Boost & Adaboost algorithm.

In some embodiments, the extraction component 130 comprises a single contextual model trained on one or more source platforms and/or one or more target platforms. For example, a particular contextual model can be trained in order to transform items stored in a particular source platform (e.g., word processing documents) without regard to the target platform(s).

In some embodiments, the extraction component 130 comprises a plurality of contextual models with each trained for a particular source platform and/or one or more target platforms. For example, a particular contextual model can be trained in order to transform items stored in a particular source platform (e.g., emails) into a plurality of target platforms.

In some embodiments, a particular contextual model can be trained in order to transform items stored in a particular source platform taking into account a particular target platform. For example, a particular contextual model can be trained in order to transform items stored in a particular source platform (e.g., emails) into a particular target platform (e.g. document used for internal training purposes).

In some embodiments, the extraction component 130 can perform operation(s) on the selected contextual blocks (e.g., identified stored items) and modify the data to fit the target platform. In some embodiments, this can include deriving context from interactions on the source platform including, but not limited to, message time/date, message exchanges, forked threads, etc.

The system 100 further includes a transformation component 140 that transforms the extracted contextually relevant portions of the identified stored items into one or more target platforms. The transformation component 140 can further provide an output of the extracted contextually relevant portions of the identified stored items in the target platform(s). In some embodiments, providing an output comprises storing the extracted contextually relevant portions of the identified stored items in the target platform(s) (e.g., as a file). In some embodiments, providing an output comprises displaying the extracted contextually relevant portions of the identified stored items in the target platform (s) to a user.

In some embodiments, the transformation component 140 organizes the extracted contextually relevant portions of the identified stored items in accordance with a schema and/or format associated with the target platform. In some embodiments, the target platform is time-based (e.g., chronology). The extracted contextually relevant portions of the identified stored items can be arranged chronologically and/or in reverse chronology, with time and/or date information provided in a particular manner or place within the output.

In some embodiments, the transformation component 140 organizes the extracted contextually relevant portions of the identified stored items hierarchically based upon an associated probability calculated by the classifier component 110.

Optionally, the system 100 can include a feedback component 150 which can receive feedback information from the user in response to the provided output. In some embodiments, the feedback information can include a positive or negative indication regarding particular output. In some embodiments, the feedback information can include a scaled rating regarding particular output. The feedback component 150 can adapt the classification model of the classifier component 110, the contextual model of the extraction component 130, and/or the transformation component 140 based upon the received feedback information.

For example, in some embodiments, from a particular set of electronically stored items (e.g., a set of internal email threads and/or telecommunications application conversations), for a particular search query (e.g., related to "project X"), the system 100 can generate one or more of the following:
  (1) For a first particular target platform: a generated article that contains meaningful information. Including classes, function descriptions, links to existing documentation, notes and examples;
  (2) For a second particular target platform: generated documents that contains the sequence of questions and answers; and (3) For a third particular target platform: a generalized breakout of topic, answers and links between the generated documents.

In some embodiments, the user can be provided with a graphical user interface that allows the user to control aspects of the extraction component 130 and/or the transformation component 140. For example, the user can be presented with sets of contextual information identified by the classifier component 110. The contextual information can include blocks of text that contain the relevant parts of the thread aggregated by context (e.g., setup, teardown, recovery, adding users, removing users, etc.), for example:

(1) The question being asked;
(2) Initial and subsequent responses; and
(3) Related or follow-up questions.

In some embodiments, the user can select contextual information to be processed and a target platform. The extraction component 130 and/or the transformation component 140 can then utilize this information in extracting and/or transforming the selected contextual information.

Figure 2:
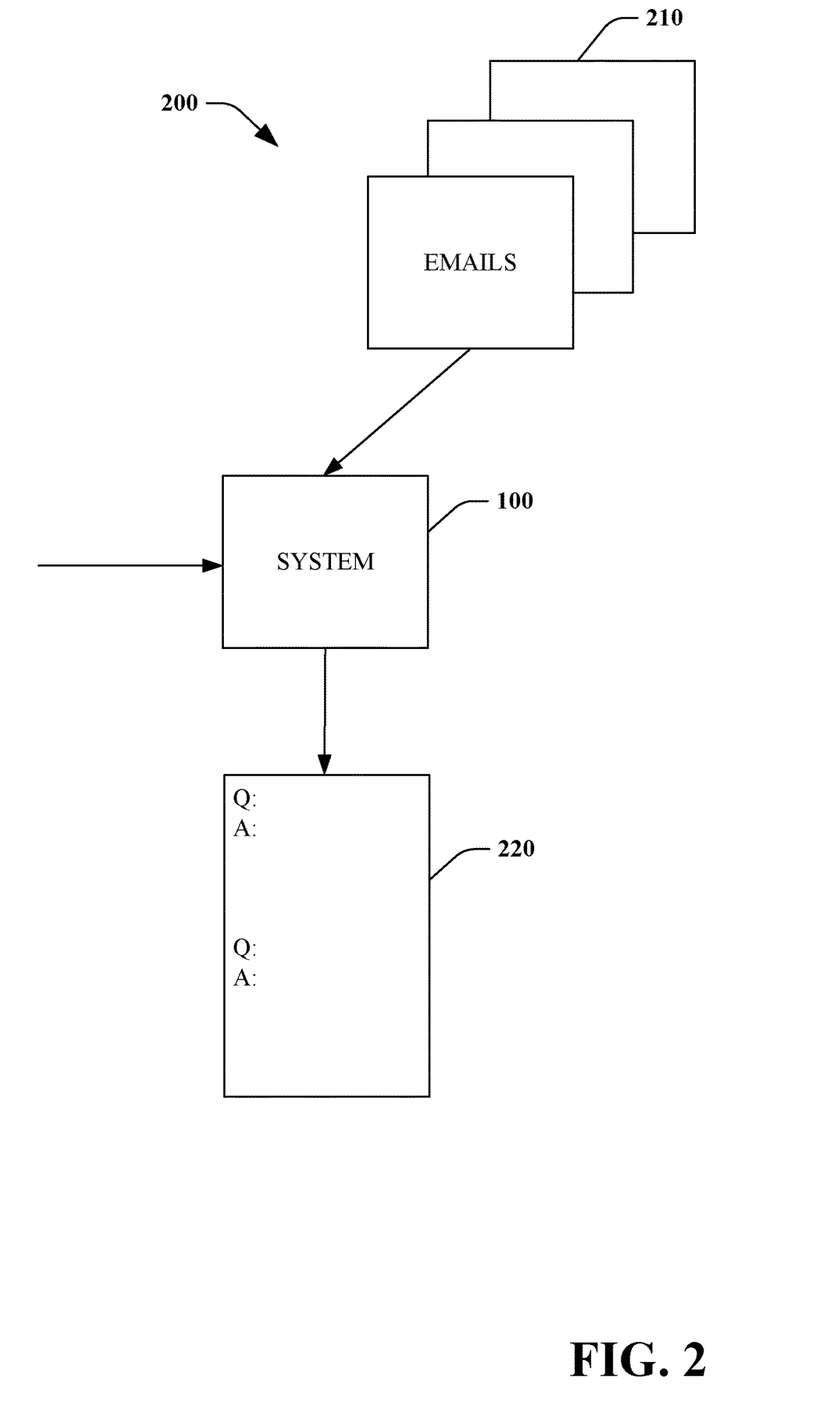
FIG. 2 is a diagram that illustrates an exemplary use of the system.

Turning to FIG. 2, a diagram 200 illustrating by way of example, and not limitation, use of the system 100. In this example, a user provides a search query which the system 100 utilizes to mine emails 210 (e.g., stored in a source platform) in order to extract relevant portions of the emails and generate a document 220 in a target platform (e.g., question and answer format).

Figure 3:
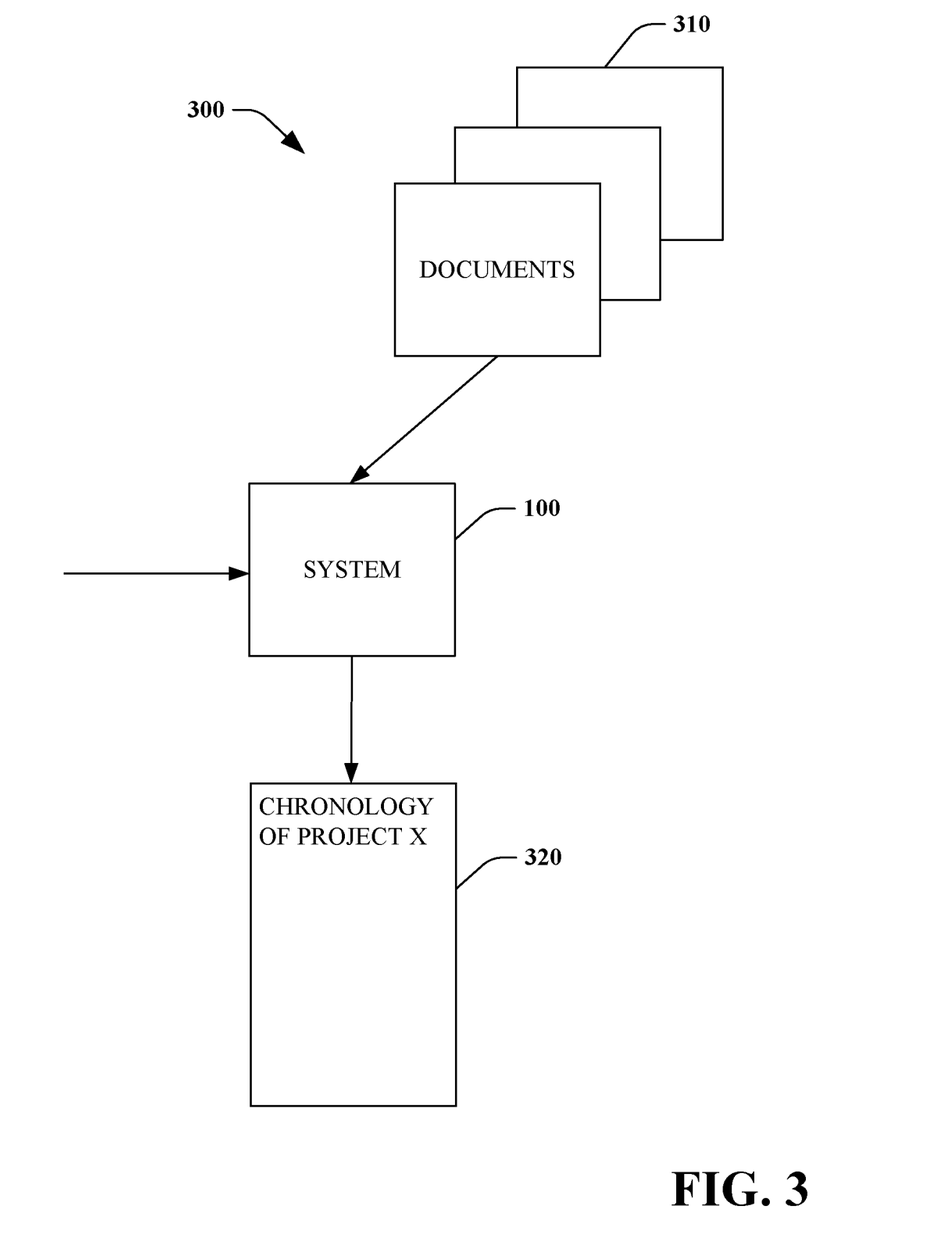
FIG. 3 is a diagram that illustrates another exemplary use of the system.

Referring to FIG. 3, a diagram 300 illustrating by way of example, and not limitation, use of the system 100. In this example, a user provides a search query (e.g., "project X") which the system 100 utilizes to mine documents 310 (e.g., stored in a source platform) in order to extract relevant portions of the documents and generate a document 320 in a target platform (e.g., chronology of project X). In some embodiments, the user can further selecting a particular transformation platform(s) of a plurality of target platforms.

Figure 4:
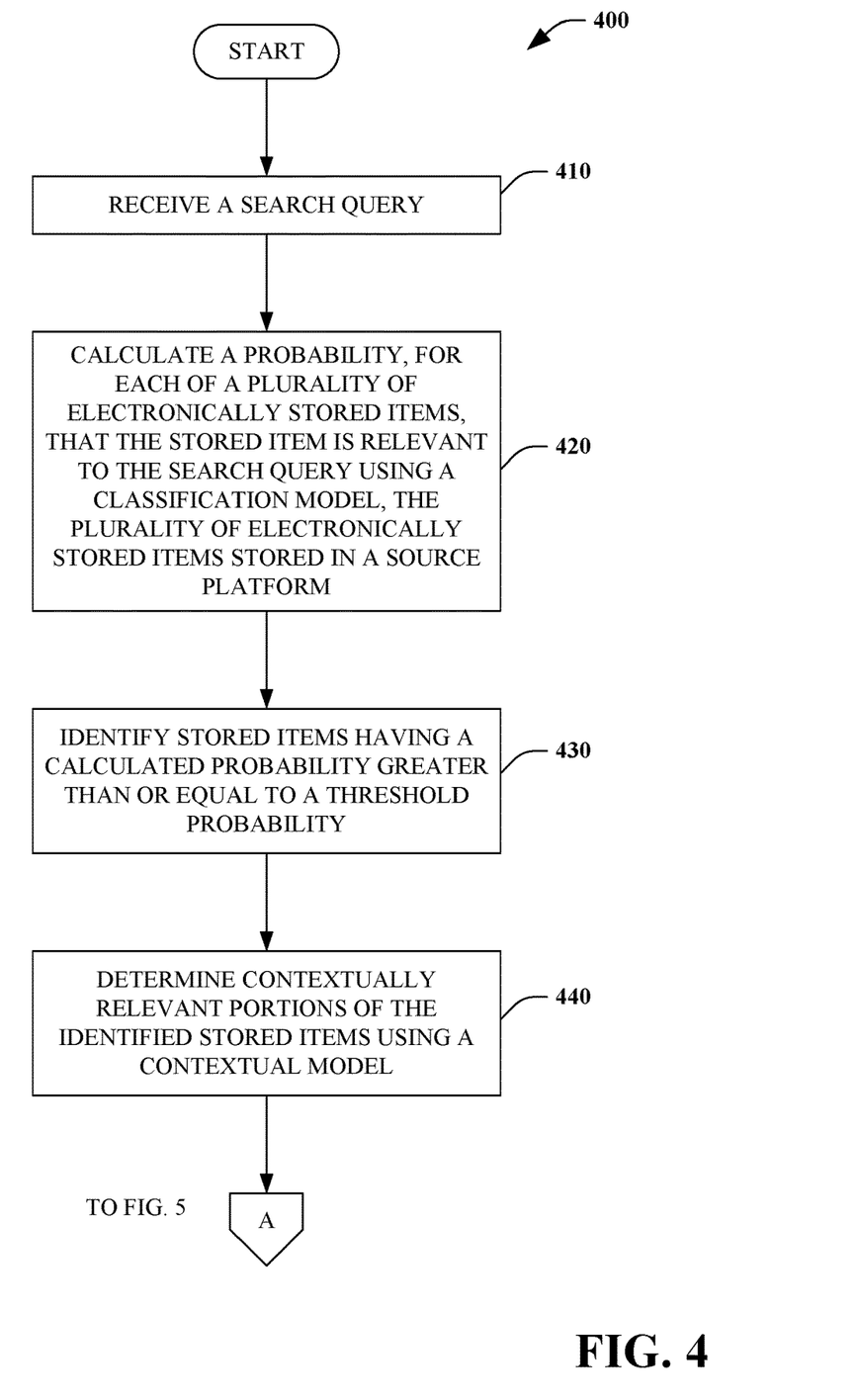
FIGS. 4 and 5 is a flow chart that illustrates a method of identifying, extracting and transforming contextually relevant portions of electronically stored items.
Figure 5:
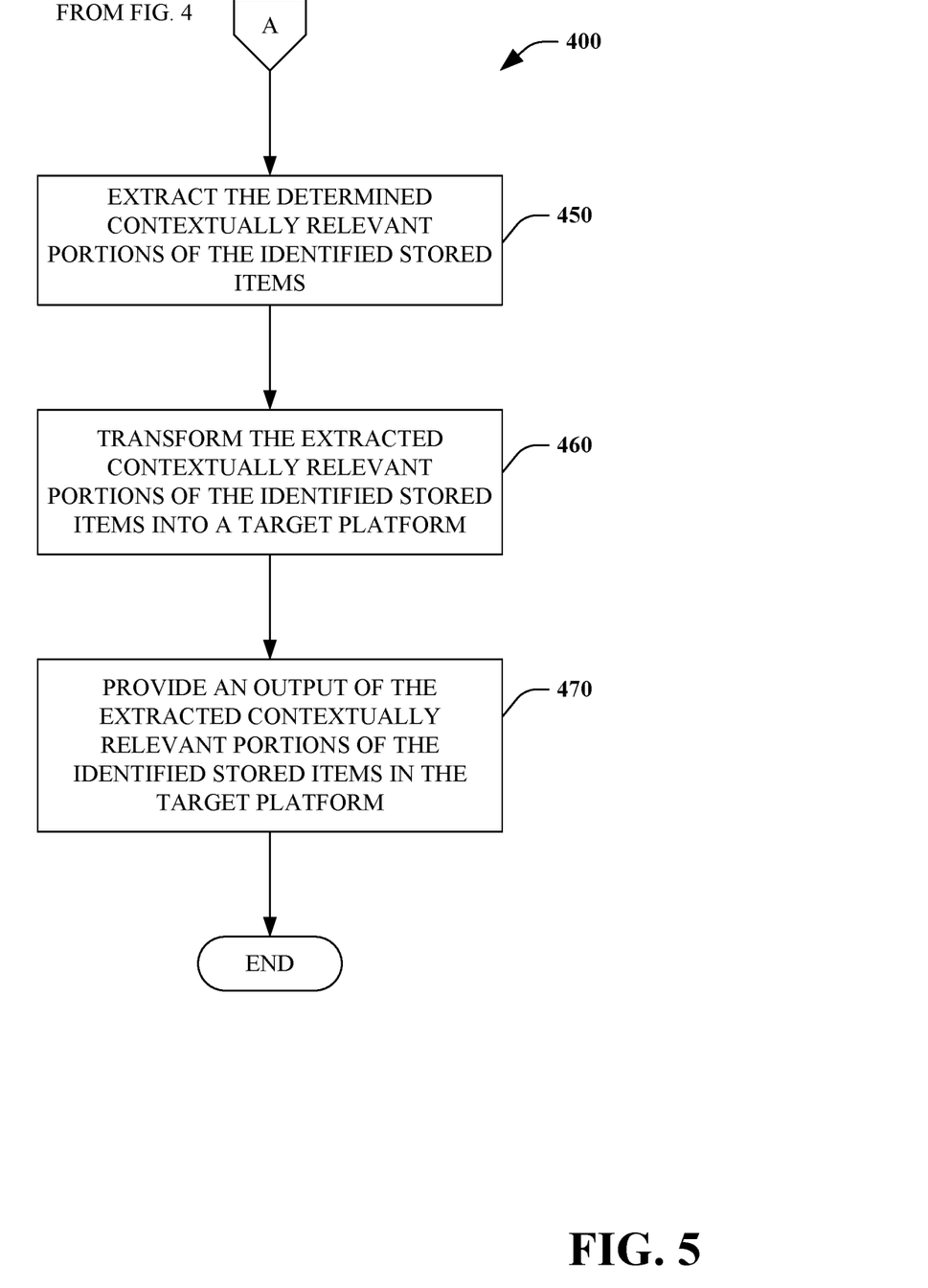

FIGS. 4 and 5 illustrate an exemplary methodology relating to identifying, extracting and transforming contextually relevant portions of electronically stored items. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIGS. 4 and 5, a method of identifying, extracting and transforming contextually relevant portions of electronically stored items 400 is illustrated. In some embodiments, the method 400 is performed by the system 100.

At 410, a search query is received. At 420, for each of a plurality of electronically stored items, a probability that the stored item is relevant to the search query is calculated using a classification model. The plurality of electronically stored items are in a source platform (e.g., schema, format, etc.)

At 430, stored items having a calculated probability greater than or equal to a threshold probability are identified.

At 440, contextually relevant portions of the identified stored items are determined using a contextual mode. At 450, the determined contextually relevant portions of the identified stored items are extracted.

At 460, the extracted contextually relevant portions of the identified stored items are transformed into a target platform. At 470, an output of the extracted contextually relevant portions of the identified stored items in the target platform is provided.

Described herein is a system for transforming contextually relevant items, comprising: a processing system comprising a processor and memory having computer-executable instructions stored thereupon which, when executed by the processor, cause the processing system to: receive a search query; calculate a probability, for each of a plurality of electronically stored items, that the stored item is relevant to the search query using a classification model, the plurality of electronically stored items stored in a source platform; identify stored items having a calculated probability greater than or equal to a threshold probability; determine contextually relevant portions of the identified stored items using a contextual model; extract the determined contextually relevant portions of the identified stored items; transform the extracted contextually relevant portions of the identified stored items into a target platform; and, provide an output of the extracted contextually relevant portions of the identified stored items in the target platform.

The system can further include wherein the stored items comprise at least one of a binary file, a database file, a text-based file, an image file, or an audio file. The system can include wherein the source platform is a feature of the classification model. The system can further include wherein the target platform is a feature of the classification model.

The system can further include wherein the classification model is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

The system can include wherein the source platform is a feature of the contextual model. The system can further include wherein the target platform is a feature of the contextual model. The system can further include wherein the contextual model is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm. The system can further include the memory having further computer-executable instructions stored thereupon which, when executed by the processor, cause the processing system to: receive feedback information from a user; and adapt at least one of the classification model, the contextual model, or a transformation component that transforms the extracted contextually relevant portions based upon the received feedback information.

Described herein is a method of identifying, extracting and transforming contextually relevant portions of electronically stored items, comprising: receiving a search query; calculating a probability, for each of a plurality of electronically stored items, that the stored item is relevant to the search query using a classification model, the plurality of electronically stored items stored in a source platform;

identifying stored items having a calculated probability greater than or equal to a threshold probability; determining contextually relevant portions of the identified stored items using a contextual model; extracting the determined contextually relevant portions of the identified stored items; transforming the extracted contextually relevant portions of the identified stored items into a target platform; and providing an output of the extracted contextually relevant portions of the identified stored items in the target platform.

The method can further include wherein the stored items comprise at least one of a text-based file, an image file, or an audio file. The method can include wherein the source platform is a feature of at least one of the classification model or the contextual model. The method can further include wherein at least one of the classification model or the contextual model is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

The method can further include receiving feedback information from a user; and adapting at least one of the classification model, the contextual model, or a transformation component that transforms the extracted contextually relevant portions based upon the received feedback information.

Described herein is a computer storage media storing computer-readable instructions that when executed cause a computing device to: receive a search query; calculate a probability, for each of a plurality of electronically stored items, that the stored item is relevant to the search query using a classification model, the plurality of electronically stored items stored in a source platform; identify stored items having a calculated probability greater than or equal to a threshold probability; determine contextually relevant portions of the identified stored items using a contextual model; extract the determined contextually relevant portions of the identified stored items; transform the extracted contextually relevant portions of the identified stored items into a target platform; and provide an output of the extracted contextually relevant portions of the identified stored items in the target platform.

The computer storage media can further include wherein the stored items comprise at least one of a binary file, a database file, a text-based file, an image file, or an audio file. The computer storage media can further include wherein the source platform is a feature of at least one of the classification model or the contextual model. The computer storage media can further include wherein at least one of the classification model or the contextual model is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

The computer storage media can include further computer-readable instructions that when executed cause a computing device to: receive feedback information from a user; and adapt at least one of the classification model, the contextual model, or a transformation component that transforms the extracted contextually relevant portions based upon the received feedback information. The computer storage media can further include wherein one of the features when training the classification model is at least one of an organizational hierarchy or group membership.

Figure 6:
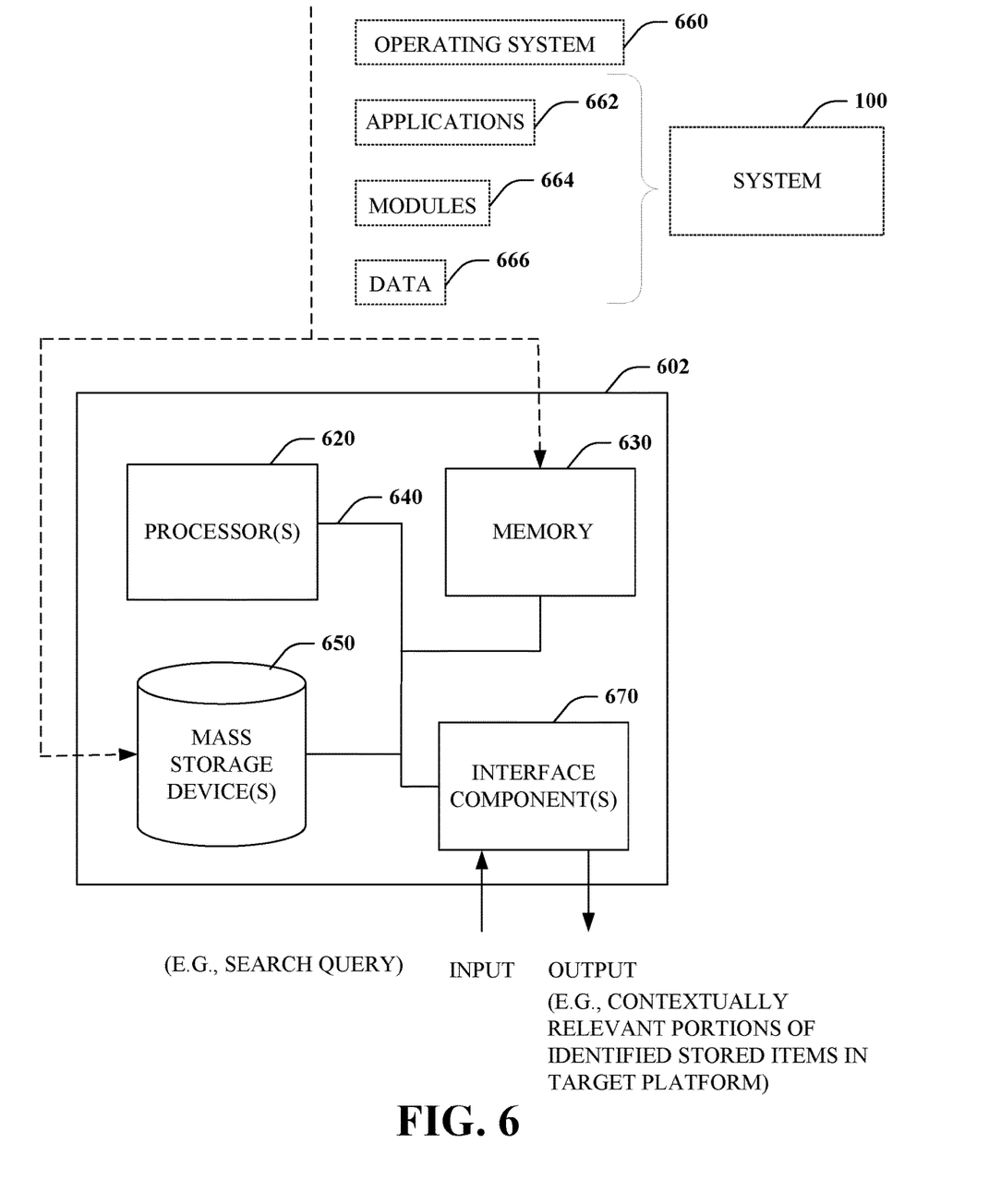
FIG. 6 is a functional block diagram that illustrates an exemplary computing system.

With reference to FIG. 6, illustrated is an example general-purpose processing system, computer or computing device 602 (e.g., mobile phone, desktop, laptop, tablet, watch, server, hand-held, programmable consumer or industrial electronics, set-top box, game system, compute node, etc.). For instance, the computing device 602 may be used in a system for transforming contextually relevant items 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device (s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a processor; and
    a memory having computer-executable instructions stored thereupon which, when executed by the processor, cause the system to:
    access a plurality of stored items stored in a source format having multiple fields, wherein the plurality of stored items collectively comprise text data of sentences from conversations among multiple users;
    based at least on a particular query, identify selected stored items from the plurality of stored items using a classification model that is trained to weight individual fields of the source format differently;
    extract selected portions from the selected stored items, the selected portions comprising selected text data of selected sentences extracted from the selected stored items;
    after extracting the selected portions from the selected stored items, modify the selected portions of the selected stored items into a target format that represents information differently than the source format; and
    output information content of the selected portions of the selected stored items in the target format.

2. The system of claim 1, wherein the selected stored items comprise at least one of a binary file, a database file, a text-based file, an image file, or an audio file.

3. The system of claim 1, wherein the computer-executable instructions, when executed by the processor, cause the system to:

using the classification model, determine respective probabilities that each of the plurality of stored items is relevant to the particular query; and
select the selected stored items from the plurality of stored items based at least on the respective probabilities.

4. The system of claim 3, wherein identifiers of the source format and the target format are features used by the classification model to determine the respective probabilities that each of the plurality of stored items is relevant to the particular query.

5. The system of claim 3, wherein the classification model is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

6. The system of claim 1, wherein the computer-executable instructions, when executed by the processor, cause the system to:
determine the selected portions based at least on an indication by a contextual model that the selected portions are contextually relevant to the particular query.

7. The system of claim 6, wherein the source format and the target format are features used by the contextual model to identify the selected portions as being contextually relevant to the particular query.

8. The system of claim 6, wherein the contextual model is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, or a Gradient Boost & Adaboost algorithm.

9. The system of claim 1, wherein the source format comprises an email thread format, the selected stored items comprise selected emails, the target format comprises a question and answer format, and the computer-executable instructions, when executed by the processor, cause the system to:
generate one or more documents that contain questions and answers that convey the information content of the selected portions of the selected emails.

10. A computer-implemented method, comprising:
accessing a plurality of stored items stored in a source format having multiple fields, wherein the plurality of stored items collectively comprise text data representing conversations among multiple users;
based at least on a particular query, identifying selected stored items from the plurality of stored items using a classification model that is trained to weight individual fields of the source format differently;
extracting selected portions from the selected stored items, the selected portions comprising selected text data extracted from a selected conversation;
after extracting the selected portions from the selected stored items, modifying the selected portions of the selected stored items into a target format that represents information differently than the source format; and
outputting information content of the selected portions in the target format.

11. The computer-implemented method of claim 10, wherein the outputting comprises storing the information content of the selected portions as one or more files in the target format.

12. The computer-implemented method of claim 10, wherein the source format comprises an email thread format, the target format comprises a question and answer format, and the modifying comprises organizing at least one email thread into a corresponding question and answer.

13. The computer-implemented method of claim 10, wherein the source format comprises an instant messaging format, the selected stored items comprise selected instant messages, the target format comprises a question and answer format, and the method further comprises:
generating one or more documents that contain questions and answers that convey the information content of the selected portions of the selected instant messages.

14. The computer-implemented method of claim 10, wherein the source format comprises an email thread format, the selected stored items comprise selected emails, the target format comprises an article format, and the method further comprises:
generating an article containing classes, function descriptions, links to existing documentation, notes, and examples, wherein the article conveys the information content of the selected portions of the selected emails.

15. A computer storage media storing computer-readable instructions that, when executed, cause a computing device to:
access a plurality of stored items stored in a source format having multiple fields, wherein the plurality of stored items collectively comprise user communications represented in the source format;
based at least on a particular query, identify selected stored items from the plurality of stored items using a classification model that is trained to weight individual fields of the source format differently;
extract selected conversation portions from the selected stored items;
after extracting the selected conversation portions from the selected stored items, organize the selected conversation portions into a target format that represents information differently than the source format; and
output information content of the selected conversation portions in the target format.

16. The computer storage media of claim 15, storing further computer-readable instructions that, when executed, cause the computing device to:
display the information content of the selected conversation portions in the target format.

17. The computer storage media of claim 15, wherein the classification model is trained to assess relevance of individual queries to the plurality of stored items by:
assigning different weights to different fields of the source format and applying respective weights when the individual queries appear in corresponding fields of individual stored items.

18. The computer storage media of claim 15, wherein the classification model is trained to assess relevance of individual queries to the plurality of stored items by:
assigning different weights to different fields of the source format and applying respective weights when portions of the individual queries appear in corresponding fields of individual stored items.

19. The computer storage media of claim 17, storing further computer-readable instructions that, when executed, cause the computing device to:

receive user feedback information; and adapt the classification model based at least upon the received user feedback information.

20. The computer storage media of claim 17, storing further computer-readable instructions that, when executed, cause the computing device to:

train the classification model using a feature representing at least one of an organizational hierarchy or group membership.

* * * * *